United States Patent
Barocela et al.

(10) Patent No.: US 7,093,789 B2
(45) Date of Patent: Aug. 22, 2006

(54) DELTA-WINGED HYBRID AIRSHIP

(75) Inventors: Edward Barocela, Ballwin, MO (US); Patrick F. Cassidy, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 10/853,299

(22) Filed: May 24, 2004

(65) Prior Publication Data

US 2005/0258306 A1    Nov. 24, 2005

(51) Int. Cl.
*B64B 1/06*    (2006.01)
(52) U.S. Cl. ............................ 244/30; 244/24; 244/96; 244/901
(58) Field of Classification Search ............ 244/24–33, 244/900, 901, 903, 128, 125
See application file for complete search history.

(56) References Cited

U.S. PATENT DOCUMENTS

| | | | | |
|---|---|---|---|---|
| 3,486,719 A | * | 12/1969 | Bock et al. ................... 244/25 |
| 4,116,407 A | * | 9/1978 | Murray ........................ 244/16 |
| 4,149,688 A | * | 4/1979 | Miller, Jr. .................. 244/12.4 |
| 4,151,893 A | * | 5/1979 | Mantle ....................... 180/116 |
| 4,209,148 A | * | 6/1980 | Lemoigne .................... 244/16 |
| 4,403,755 A | * | 9/1983 | Gutsche .................... 244/53 R |
| 4,589,614 A | * | 5/1986 | Stevens ....................... 244/136 |
| 5,005,783 A | * | 4/1991 | Taylor ......................... 244/97 |
| 5,541,591 A | * | 7/1996 | Bush .......................... 340/968 |
| 5,626,052 A | * | 5/1997 | Lawson ..................... 73/304 C |
| 5,859,598 A | * | 1/1999 | Wade .......................... 340/960 |
| 5,936,552 A | * | 8/1999 | Wichgers et al. ........... 340/963 |
| 5,955,972 A | * | 9/1999 | Wade .......................... 340/960 |
| 6,136,267 A | * | 10/2000 | Bergman ..................... 422/41 |
| 6,302,357 B1 | * | 10/2001 | Kalisz .......................... 244/30 |
| 6,314,947 B1 | * | 11/2001 | Roche ......................... 123/525 |
| 6,435,164 B1 | * | 8/2002 | Kaiser et al. ............... 123/516 |
| 6,527,223 B1 | * | 3/2003 | Mondale ....................... 244/30 |
| 6,547,188 B1 | * | 4/2003 | Schmutz et al. ......... 244/135 R |
| 6,634,598 B1 | * | 10/2003 | Susko ..................... 244/135 R |
| 6,676,081 B1 | * | 1/2004 | Grabow et al. ........... 244/129.2 |
| 6,682,016 B1 | * | 1/2004 | Peroulakis .................... 244/57 |
| 6,739,359 B1 | * | 5/2004 | Jones et al. .................. 141/64 |
| 6,860,449 B1 | * | 3/2005 | Chen ......................... 244/12.1 |
| 2002/0096599 A1 | * | 7/2002 | McDermott .................. 244/25 |
| 2003/0048203 A1 | * | 3/2003 | Clary et al. ................. 340/945 |

(Continued)

OTHER PUBLICATIONS www.howstuffworks.com, "How Blimps Works", pp. 1-5.*

(Continued)

*Primary Examiner*—Teri Pham Luu
*Assistant Examiner*—S. A. Holzen
(74) *Attorney, Agent, or Firm*—Shimokaji & Associates, P.C.

(57) ABSTRACT

In one aspect, a hybrid airship including an outer shell, a plurality of helium filled gas envelopes, and an all-electric propulsion system may have the shape of a delta-wing. In some embodiments, the hybrid airship may be launched using buoyancy lift alone and aerodynamic lift may be provided by the all-electric propulsion system. In one aspect, a photovoltaic array and a high energy density power storage system may be combined to power the propulsion system making the propulsion system regenerative. The delta-wing shape can provide a surface area large enough to accommodate very large circular or elliptical transmission devices. By continuously recharging the power storage system, the hybrid airship in accordance with some embodiments can stay aloft at an operational altitude of at least about 85,000 ft for months or even years. The hybrid airship may function as an airborne military communications relay platform.

16 Claims, 6 Drawing Sheets

U.S. PATENT DOCUMENTS

2003/0141409 A1* 7/2003 Lisoski et al. ................ 244/13
2003/0192985 A1* 10/2003 Lipeles ........................ 244/13
2004/0004356 A1* 1/2004 Akimoto et al. ............ 290/1 B
2005/0151007 A1* 7/2005 Cadogan et al. .......... 244/35 R
2005/0258306 A1* 11/2005 Barocela et al. .............. 244/30

OTHER PUBLICATIONS

David A. Fulghum, Northrop Grumman Unmanned Systems, Aviation week & Space Technology, Oct. 20, 2003, p. 70.
Kenneth Munson, Ohio Dynalifter, Jane's All the World's Aircraft 2004-2005, Feb. 13, 2004.

* cited by examiner

DELTA-WINGED HYBRID AIRSHIP

BACKGROUND OF THE INVENTION

The present invention generally relates to unmanned aerial vehicles and airships and, more particularly, to a hybrid airship having the shape of delta-wing and to a method for using the delta-winged hybrid airship as an unmanned airborne communications relay platform.

To enhance intelligence-gathering, surveillance, reconnaissance, and communications relay it would be useful to have unmanned aerial vehicles available that can operate at very high altitudes and that have a high endurance. The capability to operate at very high altitudes is desirable to make the platform survivable against anti-aircraft threats, to maximize the line-of-sight radius for sensors and communications equipment, and to place the aircraft above the effects of atmospheric weather system. One of the challenges of designing a fixed wing aircraft to cruise at high altitudes is the achievement of a low structural weight. Such aircraft require large wing areas due to the very low density of air at high altitudes, so that the wing weight becomes a key design driver. A possible alternative to fixed wing aircraft is to carry the payload in a lighter-than-air vehicle, such as an airship, but very large volume gas envelopes are needed to achieve neutral buoyancy at high altitudes. Therefore, these lighter-than-air vehicles are large and heavy, which limits the altitude at which the vehicles can operate.

Furthermore, there is a need for airborne platforms that are able to carry high power directed energy devices as a payload and that can operate as communications relay platforms. It is further desirable, to operate such airborne platform at high altitudes out of reach for anti-aircraft threats and above the effects of atmospheric weather systems. In order to be effective, it is still further desirable that such airborne platforms have a high endurance. High power directed energy devices, such as large area electromagnetic antennas, usually have a very large circular or elliptical shape. Therefore, aerial vehicles carrying such devices need to provide a large wing area in which the devices can be integrated which may limit the operational altitude as well as the endurance of the aerial vehicle.

Prior art unmanned aerial vehicles include, for example, the Global Hawk, a high altitude, long-endurance unmanned aerial vehicle used by the US Air Force as a surveillance aircraft. The Global Hawk air vehicle is to provide high resolution synthetic aperture radar that can penetrate cloud-cover and sandstorms and electro-optical/infrared imagery at long range with long loiter times over target areas. The Global Hawk is capable of both wideband satellite and line-of-sight data link communications. The capabilities of the Global Hawk allow more precise targeting of weapons and better protection of forces through superior surveillance capabilities. However, while being a unmanned aircraft, the Global Hawk still is a reusable heavier-than-air craft using fossil fuels. The power output of conventional combustion engines and turbines decreases drastically at high altitudes because of the corresponding decrease in density of air, which is necessary to maintain the combustion of fossil fuels. A runway is needed for launching the Global Hawk and for the landing. The Global Hawk has an operating range of up to 3000 nautical miles from its launch area, with its loiter capability over the target area limited to about 24 to 36 hours at altitudes of about 60,000 to 66,000 feet. The operating range, the loiter time over a target area, and the altitude of the global hawk are limited since the Global Hawk still is an conventional heavier-than-air aircraft using fossil fuels. For future reconnaissance missions, unmanned aerial vehicles with even longer loiter capabilities over a target area at even higher altitudes are desired.

Concepts have been disclosed for futuristic unmanned aircraft missions that reach beyond the standard intelligence-gathering mission to very long-range strike, vertical operations, and ultra-long-endurance surveillance. One advanced concept was reported, for example, by David A. Fulghum in Aviation Week & Space Technology, Oct. 20, 2003, page 70. This article describes an unmanned aerial vehicle disclosed by the Northrop-Grumman Unmanned Systems group in Rancho Bernardo, Calif. To optimize the benefit of flying without a crew, a four-engine Ultra-Hale (high-altitude, long-endurance) unmanned aerial vehicle is disclosed that is designed to stay aloft for three months with a surveillance sensor payload. Designed as a wing filled with a combination of hydrogen and helium to achieve zero buoyancy, the aircraft can be launched without a conventional runway. By using the explosive gas hydrogen, the disclosed aerial vehicle may not be safe to operate and prone to accidents. Once aloft, the aircraft takes about half a day using its combination powerplants (involving solar energy and fuel cells) to climb to an operating altitude of 80,000–120,000 ft. However, the endurance of the described flying wing aircraft and therefore of reconnaissance missions would be limited by the reliability and lifetime of the fuel cells, even if the fuel cells are supplemented by solar panels. Furthermore, endurance longer than the three months said to be reached by described flying wing aircraft is desirable.

The article by David A. Fulghum also discloses a delta-winged unmanned aircraft for strike/reconnaissance missions that can be launched from small-deck ships without catapults and arresting gear. While being able to takeoff and land vertically, the disclosed delta-winged unmanned aircraft is still an conventional aircraft depending an fossil fuels as an energy source. Consequently, the endurance of the delta-winged aircraft is limited by the amount of fuel that can be carried.

As can be seen, there is a need for an unmanned aerial vehicle that has a large enough wing area to carry high power directed energy devices as a payload, that has a high endurance, and that can be operated at very high altitudes. Furthermore, there is a need for an unmanned aerial vehicle that does not depend on conventional runways for launching and landing. Also, there is a need for an airborne platform that can be used for intelligence-gathering, surveillance, reconnaissance, and communications relay missions over an extended period of time and at altitudes high enough to make the aerial vehicle survivable against anti-aircraft threats, to maximize the line-of-sight radius for sensors and communications equipment, and to place the aerial vehicle above the effects of atmospheric weather system. There has also arisen a need to provide an unmanned aerial vehicle that is capable of carrying high power directed energy devices and of operating at very high altitudes for flights of long durations. There has further arisen a need to provide an unmanned aerial vehicle that uses a propulsion system that is independent from fossil fuels and fuel cells and, therefore, does not limit the flight endurance of the aerial vehicle. There has also arisen a need to provide an aerial vehicle, such as a hybrid airship, that combines the advantages of heavier-than-air technology and lighter-than-air technology.

SUMMARY OF THE INVENTION

In accordance with an aspect of the present invention, a hybrid airship may be operated as an airborne platform at very high altitudes and may be capable of very long flight endurances. In accordance with another aspect of the present invention, a hybrid airship may have the shape of a delta-wing and may allow the integration of very large circular or elliptical transmission devices. In accordance with still another aspect of the present invention, the hybrid airship may be suitable for, but not limited to, communications relay missions for military assets and an airborne platform for high power directed energy devices. Another aspect of the present invention may provide a method for using the delta-winged hybrid airship as an unmanned airborne communications relay platform.

In one aspect of the present invention, a delta-winged hybrid airship may comprise an outer shell, a plurality of gas envelopes within the outer shell, and an all-electric propulsion system connected with the outer shell. The gas envelopes may store helium and may provide buoyancy lift to the hybrid airship. The all-electric propulsion system may be operable to provide aerodynamic lift to the hybrid airship.

In another aspect of the present invention, an all-electric regenerative propulsion system may comprise a high energy density power storage system, an electric motor that may receive power from the power storage system during nighttime hours, a propeller that may be coupled and configured to be driven by the electric motor, and a photovoltaic array. The photovoltaic array may be configured to provide power to the electric motor and to recharge the power storage system during daylight hours.

In still another aspect of the present invention, an airfoil of a hybrid airship may comprise a semi-rigid outer shell inflatable to a delta wing shape, and a plurality of gas envelopes within the outer shell. Each of the gas envelopes may be inflatable and may store helium.

In a further aspect of the present invention, an unmanned airborne communications relay platform may comprise an outer shell including an upper skin, a lower skin, a rounded leading edge and a sharp trailing edge, a first vertical tail located at a first intersection of the leading edge and the trailing edge, a second vertical tail located at a second intersection of the leading edge and the trailing edge, a plurality of gas envelopes filling the internal volume defined by the outer shell, an all-electric regenerative propulsion system including a plurality of propulsion pods located along the trailing edge, a high energy density power storage system located within the internal volume, a photovoltaic array located on the upper skin, and a power conditioning unit located within the internal volume, a plurality of reservoir gas envelopes, a payload including transceiver elements that form a large circular or oval phased array antenna integrated into the lower skin of the outer shell, and an avionics suite located within the internal volume of the outer shell. The outer shell may be made out of a semi-rigid material, may be inflatable, and may define an internal volume. The outer shell may have the shape of a delta-wing. The gas envelopes may receive and store helium, and may provide buoyancy lift to the airborne communications relay platform. The propulsion pods may include a low Reynolds number propeller driven by an electric motor. The power storage system may include an energy storage medium selected from the group of lithium-ion batteries, lithium-ion battery systems including polymer sheets, and capacitor banks. The power conditioning unit may distribute the electrical power between the photovoltaic array, the energy storage system, and the electric motor. The all-electric propulsion system may be operable to provide aerodynamic lift to the airborne communications relay platform. The reservoir gas envelopes may receive excess helium from the gas envelopes during an ambient atmospheric pressure decrease. The avionics suite may be capable of satellite communications and of line-of-sight communications.

In still a further aspect of the present invention, a single mission hybrid airship may comprise an outer shell, a plurality of gas envelopes within the outer shell, an all-electric regenerative propulsion system connected with the outer shell, and an electrically driven impeller. The gas envelopes may store helium and may provide buoyancy lift to the hybrid airship. The regenerative all-electric propulsion system may be operable to provide aerodynamic lift to the hybrid airship. The impeller may provide pressurized air to keep the gas envelopes inflated after the helium may be lost through leakage.

In still another aspect of the present invention, a method for using a delta-winged hybrid airship as an unmanned airborne communications relay platform may include the steps of: providing a delta-winged hybrid air ship including an all-electric regenerative propulsion system, preparing the hybrid airship for launch, launching the hybrid airship using buoyancy lift alone, letting the hybrid airship ascend vertically to an equilibrium altitude, transitioning the hybrid airship to forward flight by activating the propulsion system, bringing the hybrid airship up to the operational altitude using the buoyancy lift and aerodynamic lift, and moving the hybrid airship to a theater of operations using mainly the aerodynamic lift.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention may provide an unmanned aerial vehicle that may be capable to operate at very high altitudes for very long flight endurances. Contrary to the known prior art, the unmanned aerial vehicle as in one embodiment of the present invention may combine the advantages of heavier-than-air technology and of lighter-than-air technology by providing a hybrid airship that has the shape of a delta-wing combined with an all-electric propulsion system. The hybrid airship of one embodiment of the present invention may be used, for example, as a military intelligence, surveillance, and reconnaissance platform, a military communications relay platform, and as a platform for high power directed energy devices. Other applications may include civilian aviation activities, such as reconnaissance and ground surveillance for mapping, traffic monitoring, science, and geological survey, as well as border surveillance, fishery patrols, or the prevention of smuggling and illegal migration.

In accordance with an aspect of the present invention, a hybrid airship may have the shape of a delta-wing. By constructing the hybrid airship in a delta-wing shape containing buoyant gas (e.g., helium), both buoyancy lift and aerodynamic lift may be supported. The internal volume of the hybrid airship of one embodiment of the present invention may contain helium rather than a combustible gas, providing safe operation of the hybrid airship and allowing the airship to be launched using buoyancy lift alone. Therefore, the need for runways or landing gear can be eliminated. By choosing different designs of gas envelopes for holding the helium, for example, conformal gas envelopes or cylindrical gas envelopes, the buoyancy lift of the hybrid airship can be maximized, or structural efficiency for packaging the helium can be maximized, or an optimal combination of such characteristics can be achieved.

Furthermore, by providing a delta-wing having a wing area of at least about 78,200 sq. ft in accordance with an embodiment of the present invention, the hybrid airship may have transceiver elements integrated into the lower skin of the wing to form a large circular or oval phased array antenna and still may be operated at altitudes higher than known prior art aerial vehicles suitable for similar tasks.

Another embodiment of the present invention may provide an all-electric propulsion system for the hybrid airship including low Reynolds number propellers driven by electric motors, a high energy density storage system using either batteries or capacitor banks, and a photovoltaic array. Contrary to known prior art propulsion systems, the propulsion system of one embodiment of the present invention does not require fossil fuels or the use of fuel cells. By regenerating the all-electric propulsion system of one embodiment of the present invention by the photovoltaic array, flight endurance of the hybrid airship may not be limited by the amount of fuel that can be carried, contrary to the known prior art. Furthermore, the power output of the electric motors in accordance with an aspect of the present invention may be independent of the ambient atmospheric pressure. By providing the all-electric propulsion system of one embodiment of the present invention, the hybrid airship may be operated at very high altitudes for very long flight endurances. Contrary to the known prior art, the flight time will only be limited by the reliability of the components, which may extend the flight endurance of the hybrid airship of one embodiment of the present invention to one year or more. Flight endurances this long are not possible using known prior art aerial vehicles.

An embodiment of the present invention may further provide a method for using a delta-winged hybrid airship as an unmanned airborne communications relay and reconnaissance platform. By being capable to operate at higher altitudes and for longer flight endurances than known prior art unmanned airborne platforms, such as the Global Hawk, the hybrid airship of one embodiment of the present invention will provide breakthrough capabilities in surveillance, reconnaissance, and communication relays. While the delta-winged hybrid airship of one embodiment of the present invention may be able to carry very large circular or elliptical transmission devices integrated into the lower skin the airship may still be able to operate at very high altitudes out of reach for modern anti-aircraft devices, above the effects of atmospheric weather systems, and may provide a maximized line-of-sight radius for sensors and communications equipment. Due to the long flight endurances, uninterrupted intelligence-gathering, surveillance, reconnaissance, and communications relay missions may be conducted having a higher efficiency than current standard procedures.

Figure 1A:
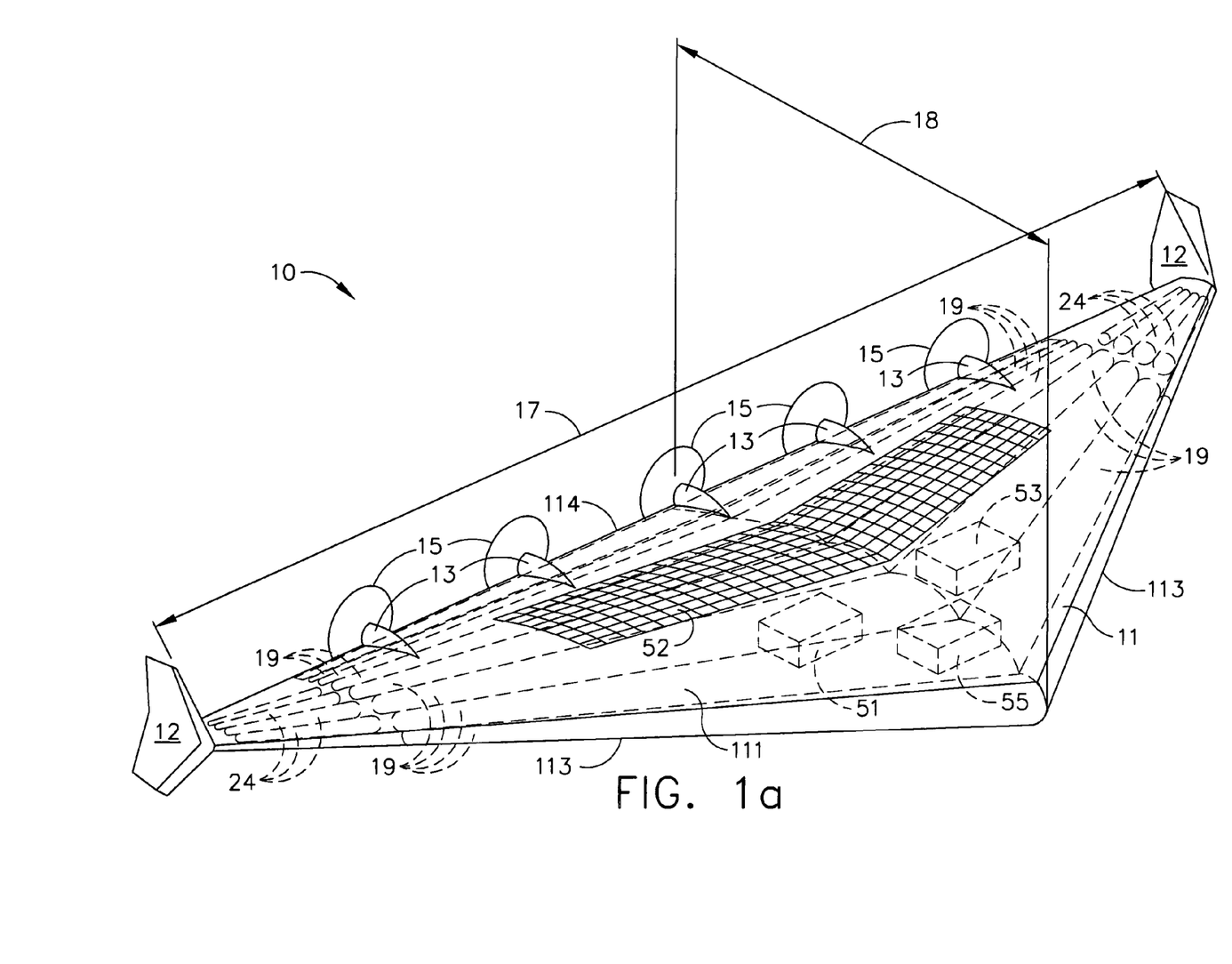
FIG. 1a is a perspective view from above of a hybrid airship according to one embodiment of the present invention.
Figure 1B:
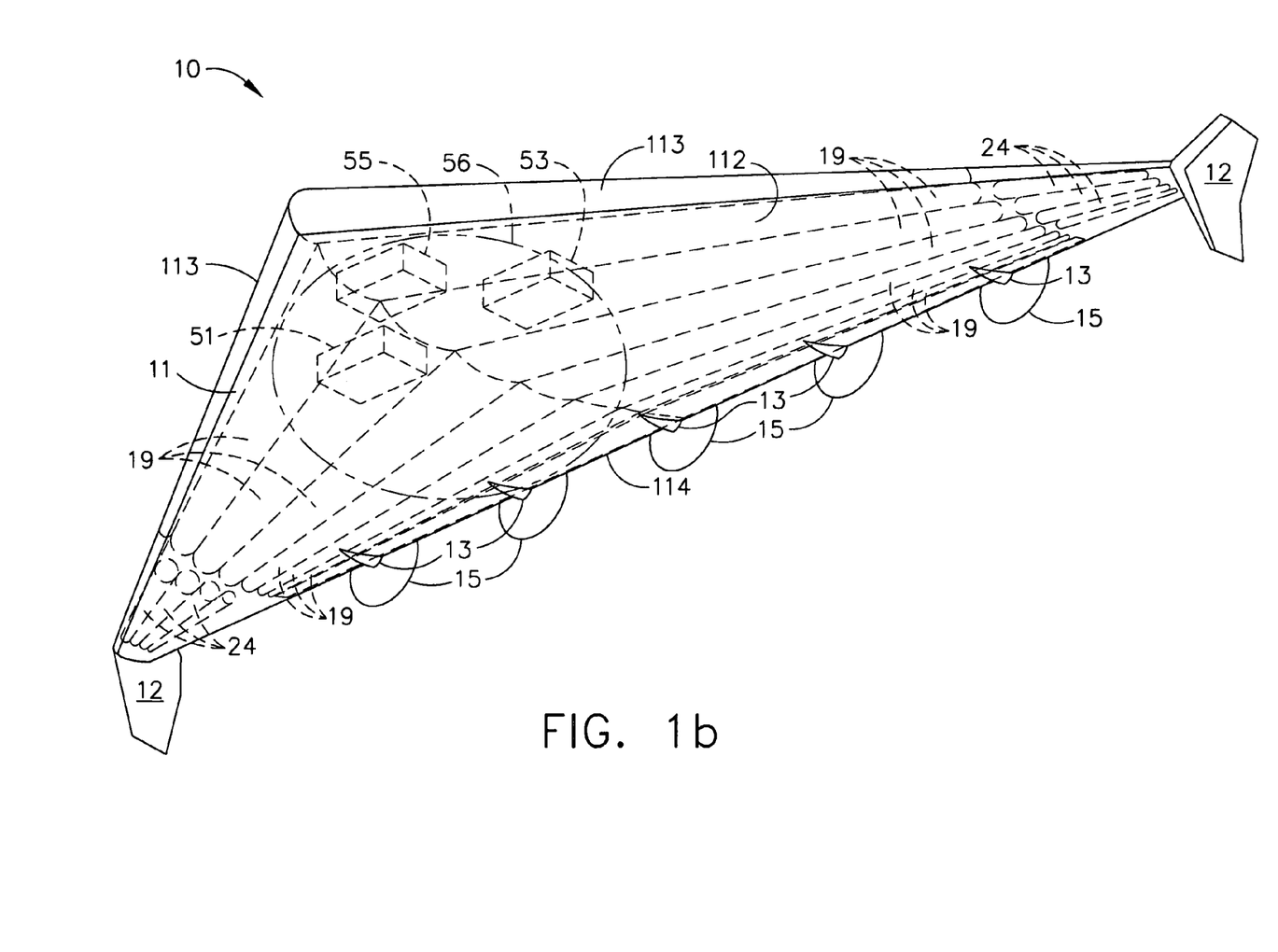
FIG. 1b is a perspective view from below of a hybrid airship according to one embodiment of the present invention.
Figure 2:
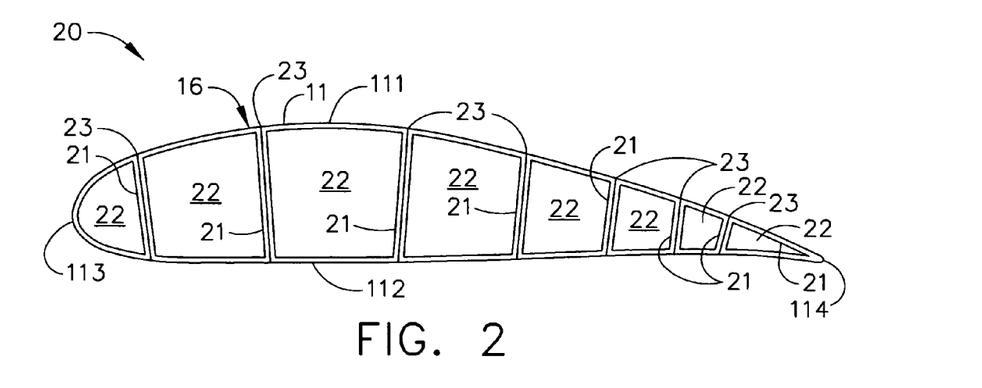
FIG. 2 is a cross-sectional view of a conformal gas envelope design according to one embodiment of the present invention.
Figure 3:
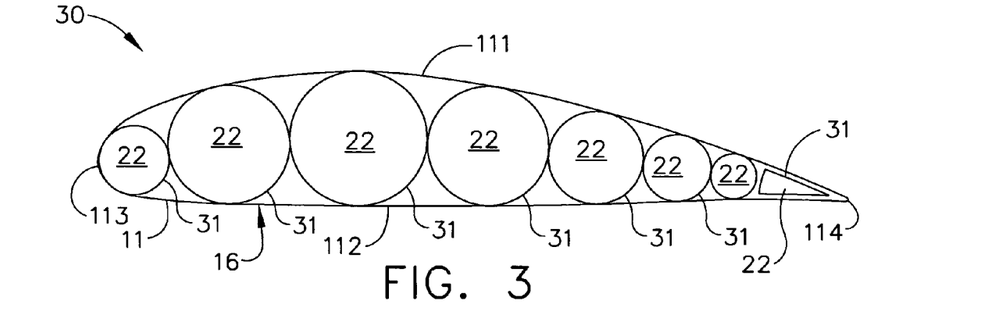
FIG. 3 is a cross-sectional view of a multi-bubble cylindrical gas envelope design according to one embodiment of the present invention.
Figure 5:
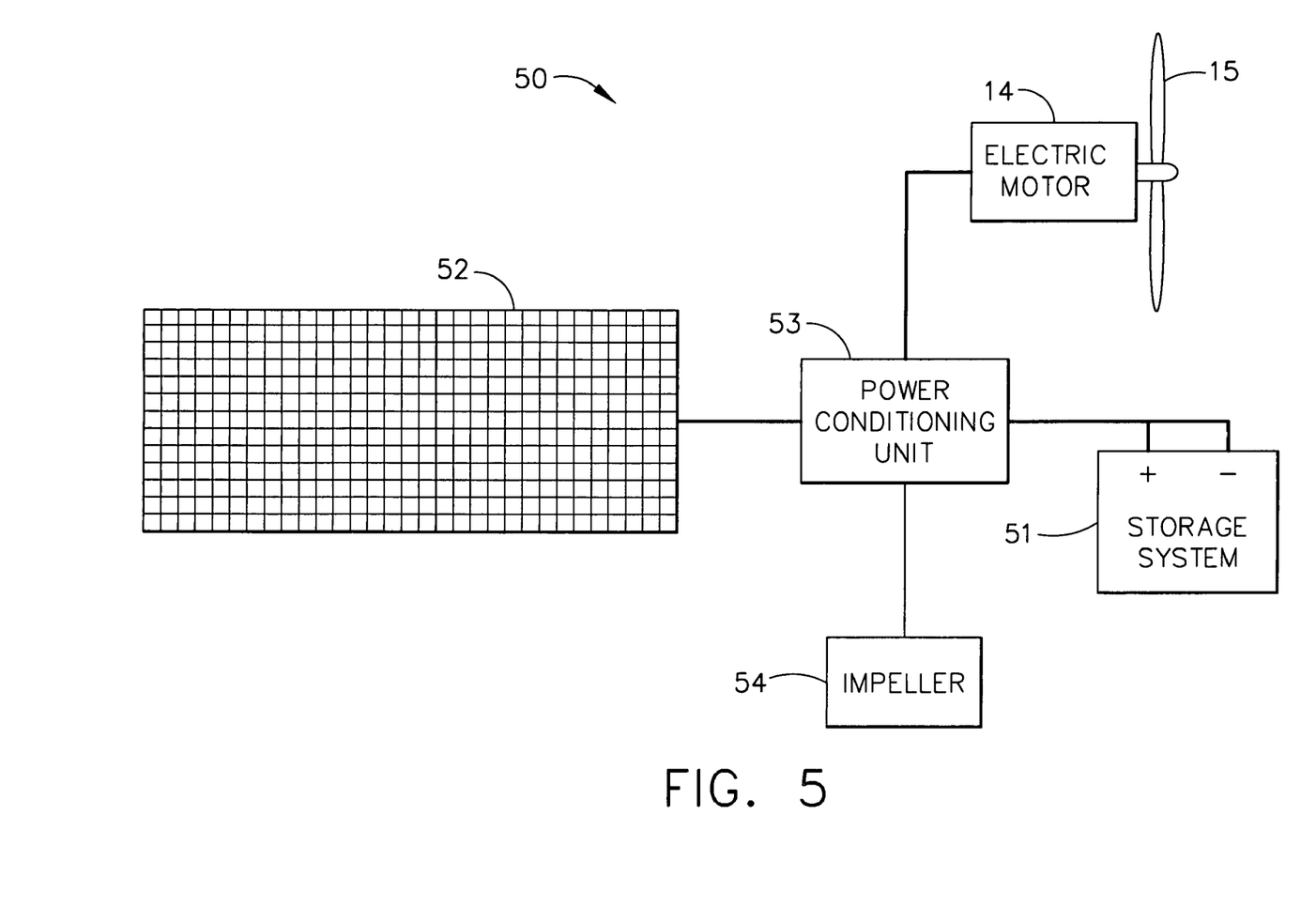
FIG. 5 is a simplified block diagram of an all-electric propulsion system according to one embodiment of the present invention.

Referring now to FIGS. 1a and 1b, a perspective view of a hybrid airship 10 from above and from below, respectively, is illustrated according to one embodiment of the present invention. The hybrid airship 10 may be an unmanned aerial vehicle. The hybrid airship 10 may include an outer shell 11, two vertical tails 12, and a plurality of propulsion pods 13. The outer shell 11 may include an upper skin 111, a lower skin 112, a leading edge 113, and a trailing edge 114. The outer shell 11 may be designed in the shape of a delta-wing having an airfoil cross-section. The delta-wing may be a wing platform in the form of a large triangle. The triangle may be preferably a isosceles triangle with two congruent sides that form the rounded leading edge 113 and a base that forms the sharp trailing edge 114. The wing span 17 of the hybrid airship 10 may be identical to the base of the triangle. The chord 18 of the hybrid airship 10 may be identical with the height of the triangle. A preferred wing span 17 may be about 630 ft and a preferred chord 18 may be about 225 ft, as shown in Table 1, resulting in an wing area of about 78,200 sq. ft. The wing area of the hybrid airship 10 may be designed to be large enough that very large circular or elliptical transmission devices, such as high power directed energy devices, may be integrated into the lower skin 112 of the outer shell 11. The outer shell 11 may be manufactured out of a semi-rigid material and, therefore, may be inflatable to the delta-wing shape. When inflated, the outer shell 11 may define an internal volume. It might also be possible, to manufacture the outer shell 11 out of a rigid material that may have the shape of a delta-wing and that may define an internal volume. Furthermore, the material of the outer shell 11 may be a multi layer system consisting of structural and insulation layers. Each vertical tail 12 may be located at the point where the leading edge 113 meets the trailing edge 114. The vertical tails 12 may provide stability and maneuverability of the hybrid airship 10. Additional vertical tails 13 may be integrated into the trailing edge 114 as needed. Each propulsion pod 13 may include an electric motor 14 and a propeller 15 that are part of an all-electric propulsion system 50, as shown in FIG. 5. The propulsion pods 13 may be evenly spaced along the trailing edge 114 of the outer shell 11. The internal volume defined by the outer shell 11 may include gas envelopes 19 that may be filled with helium to allow the hybrid airship 10 to be launched using buoyancy lift alone. The need for runways and landing gear may be eliminated. The gas envelopes 19 may be conformal gas envelopes 21 or cylindrical gas envelopes 31, as shown in FIGS. 2 and 3, respectively. The hybrid airship 10 may be steered by differential thrusting of the propellers 15. An alternative way to steer the hybrid airship 10 may be the use of thrust vectoring vanes (not shown) behind each propeller 15. Subsystems, such as the energy storage system 50 (FIG. 5), an avionics suite 55, sensors, and communication antennas, may be distributed throughout the hybrid airship 10 as necessary to balance the airship 10.

Referring now to FIG. 2, a cross-sectional view of a conformal gas envelope design 20 is illustrated according to one embodiment of the present invention. The internal volume defined by the outer shell 11 may be filled at least substantially entirely with a plurality of conformal gas envelopes 21 so that each inflated conformal gas envelope 21 forms a chamber having at least one flat side. The internal volume of the outer shell 11 may include structural elements 23, such as vertical members, that may restrict the horizontal expansion of the conformal gas envelopes 21. Further, the conformal gas envelopes 21 may be designed to include at least one flat side when inflated. The conformal gas envelopes 21 may be used to store helium 22. The conformal gas envelopes 21 may be manufactured out of a thin non-porous and lightweight material. The usage of the conformal gas envelopes 21 may have the advantage of maximizing the internal volume of the outer shell 11 for the containment of helium 22, which also maximizes the buoyant lift. In the case of a semi-rigid outer shell 11 the conformal gas envelopes 21 may when inflated be used to maintain the shape and rigidity of the outer shell. Alternate gas envelope geometries may include, for example, multi-bubble cylindrical gas envelopes, as shown in FIG. 3.

Figure 4:
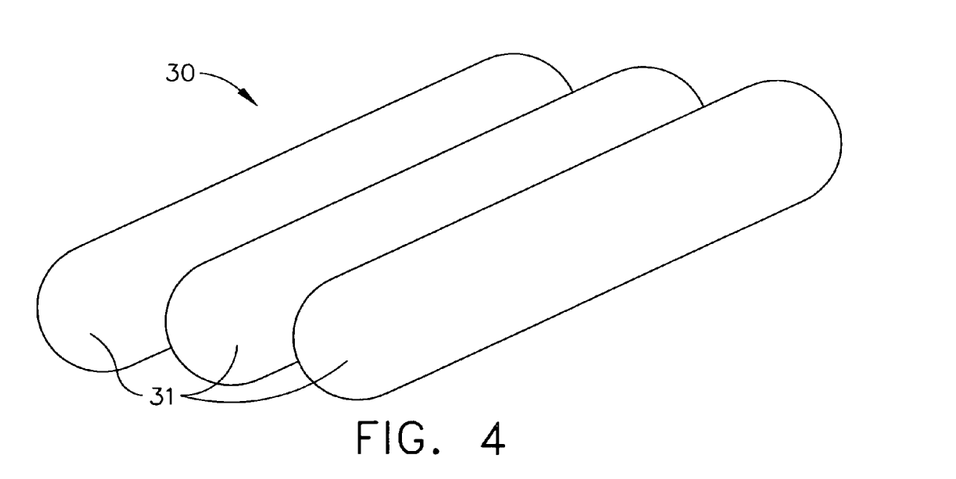
FIG. 4 is a perspective view of a multi-bubble cylindrical gas envelope design according to one embodiment of the present invention.

Referring now to FIG. 3, a cross-sectional view of a multi-bubble cylindrical gas envelope design 30 is illustrated according to one embodiment of the present invention. The internal volume defined by the outer shell 11 may be filled with a plurality of independent cylindrical gas envelopes 31 that may be used to store helium 22. The cylindrical gas envelopes 31 may be manufactured out of a thin non-porous material. The multi-bubble cylindrical gas envelope design 30 may be more structurally efficient for packaging pressurized helium, since a cylinder withstands hoop stresses better than a flat-side chamber (conformal gas envelope 21, FIG. 2) and is likely to be the lower weight solution compared to the conformal gas envelope design 20. Using the multi-bubble cylindrical gas envelope design 30 may further provide storage space throughout the internal volume defined by the outer shell while still providing the needed buoyancy lift. A perspective view of multi-bubble cylindrical gas envelopes 31 is shown in FIG. 4. Unlike conventional prior art airship designs, the conformal gas envelopes 21 and the cylindrical gas envelopes 31 are designed not to contract or expand with altitude changes. The hybrid airship 10 may be launched with the gas envelopes 21 or 31 filled to capacity with helium 22. Excess helium 22 may then be gradually pumped into reservoir gas envelopes 24 as the hybrid airship 10 ascends and the ambient atmospheric pressure decreases in order to maintain equilibrium pressure in the gas envelopes 21 or 31. The helium stored in the reservoir gas envelopes 24 may be pumped back into the gas envelopes 21 or 31 later to compensate leakage losses. In addition, the hybrid airship 10 may include a helium storage system (not shown) containing helium 22 that may be used to compensate leakage losses in the gas envelopes 21 (FIG. 2) or 31 (FIG. 3) over a long duration mission.

Referring now to FIG. 5, a simplified block diagram of an all-electric propulsion system 50 is illustrated according to one embodiment of the present invention. The all-electric propulsion system 50 may be connected with the outer shell 11 and may provide aerodynamic lift to the hybrid airship 10 (FIGS. 1a and 1b). When a wing, such as the hybrid airship 10 (FIGS. 1a and 1b ), is propelled through the air, for example, by using the all-electric propulsion system 50, there may be a force upward on the wing due to air passing more quickly over the top of the wing, such as the upper skin 111 (FIGS. 1a and 1b), than the bottom of the wing, such as the lower skin 112 (FIGS. 1a and 1b), which produces a lower pressure on the upper surface, and is known as the Bernoulli effect. The pressure difference between the upper and lower surfaces of the wing, such as the upper skin 111 and the lower skin 112 of the hybrid airship 10, caused by the Bernoulli effect generates a force that tends to lift the wing, such as the hybrid airship 10, against gravity and is, therefore, known as aerodynamic lift. The all-electric propulsion system 50 may include a plurality of propellers 15, a plurality of electric motors 14, a high energy density power storage system 51, a photovoltaic array 52, and a power conditioning unit 53. The propellers 15 may be preferably low Reynolds number propellers. Each propeller 15 may be driven by an electric motor 14. The power output of the electric motor 14 may be completely independent of the ambient atmospheric pressure. The photovoltaic array 52 may power the electric motors 14 during daylight hours while recharging the high energy density power storage system 51 for nighttime operation. Therefore, the flight endurance of the hybrid airship may not be limited by the amount of fuel that can be carried. The photovoltaic array 52 may be located on the upper skin 111 of the outer shell 11 of the hybrid airship 10. The power conditioning unit 53 may distribute the power between the photovoltaic array 52, the high energy density power storage system 51, and subsystems of the hybrid airship 10. Subsystems of the hybrid airship 10 may include, for example, a large phased array radar system 56, a directed energy device, and the electric motors 14. The subsystem of the hybrid airship 10 that may use the most electrical power may be the plurality of electric motors 14 that drive the propellers 15. The power conditioning unit 53 may further control the charge/discharge cycle of the high energy density power storage system 51. The high energy density power storage system 51 may be the main component of the all-electric propulsion system 50. The high energy density power storage system 51 may include a lightweight energy storage medium that has a high energy density of about at least 22 W-hr/kg, such as batteries or capacitor banks. Modern lithium-ion batteries may be produced with fairly high energy densities of about 220 W-hr/kg (Watt-hour per kilogram). For a one hour charge, lithium-ion batteries would be needed that weight about 1,000 lb. Another newly developed technology includes lightweight capacitor banks that may have even higher energy densities than lithium-ion batteries. Furthermore, it may be possible to use a lithium-ion battery system built using polymer sheets that is lightweight and has an energy density of about 500 W-hr/kg. By providing the photovoltaic array 52 and the high energy density power storage system 51 to power the all-electric propulsion system 50, the propulsion system 50 may be regenerative and the endurance will be limited only by the operational life and reliability of the system components, such as the electrical motors 14 und propellers 15. The propulsion system 50 may further include an electrically driven impeller 54. The impeller 54 may be operated to provide pressurized air to the gas envelopes 21 (FIG. 2) or 31 (FIG. 3) to replace helium lost through leakage during long flight endurances. The pressurized air may be used to keep the gas envelopes 21 or 31 inflated and to maintain the shape and rigidity of the outer shell 11.

Referring now to Table 1, characteristics of a hybrid airship 10, as illustrated in FIGS. 1a and 1b, are presented according to one embodiment of the present invention.

TABLE 1

|  | Delta Winged Hybrid Airship |
| --- | --- |
| Wing Span | 630 ft |
| Root Chord | 225 ft |
| Wing Area | 78,200 sq. ft |
| Volume | 720,000 cu. ft |
| Cruise Altitude | 85,000 ft |
| Cruise Speed | 95 kt |
| Payload | 2,500 lb |
| Weight | 30,000 lb |

The hybrid airship 10, as illustrated in FIGS. 1a, 1b, 2, 3, and 4 and equipped with the all-electric propulsion system 50, as illustrated in FIG. 5, may have the characteristics shown in Table 1. With a preferred wing span 17 of about 630 ft, a root chord 18 of about 225 ft, and a wing area of about 78,200 sq. ft, the delta-winged hybrid airship 10 may have transceiver elements integrated into the lower skin 112 that form a large circular or oval phased array antenna 56. The hybrid airship 10 with the characteristics shown in Table 1 may operate at cruise altitudes of about 85,000 ft and may reach a cruising speed of about 95 kt while carrying a payload of about 2,500 lb. The flight endurance of the hybrid airship 10 would only be limited by the operational life and reliability of system components and may reach a year or more.

Still referring to Table 1, the lift due to buoyancy force of a helium-filled airship may be calculated from the internal volume using the equation:

$$F_{LIFT} = (\rho_{air} - \rho_{He}) g V$$

where p is the altitude-dependent density of gas, g is the acceleration of gravity, and V is the volume of the gas envelopes 21 or 31 (as shown in FIGS. 2 and 3, respectively). The aerodynamic lift and drag at the cruise altitude may be calculated from the wing area, airfoil characteristics, and flight conditions. The drag determines the amount of electrical power needed to cruise at the desired altitude, and this may determine the weight of the storage system 50 (shown in FIG. 5), which provides electrical power when the vehicle is cruising at night.

Figure 6:
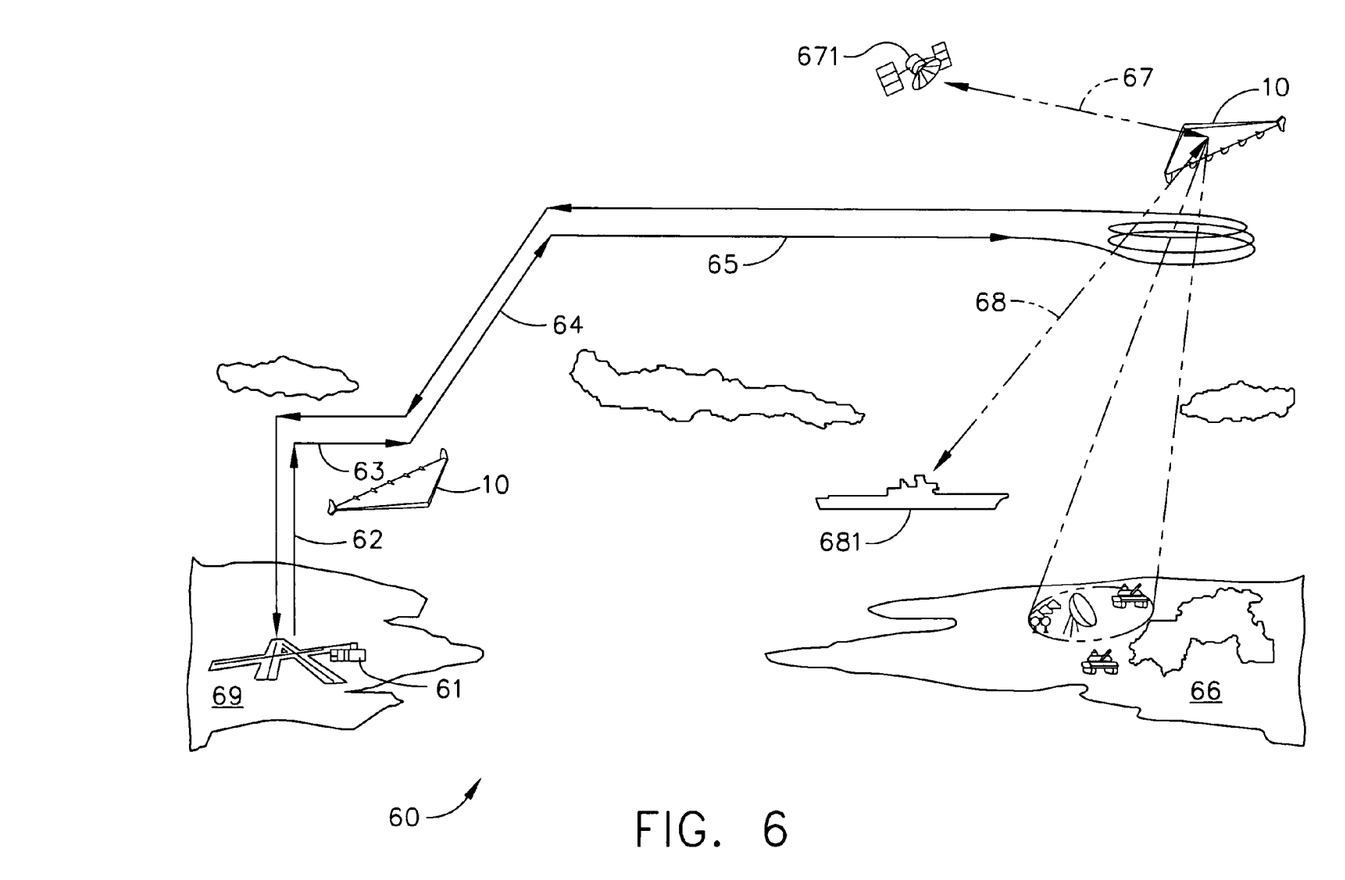
FIG. 6 is a simplified operational diagram of a hybrid airship baseline mission according to one embodiment of the present invention.

Referring now to FIG. 6, a simplified operational diagram of a baseline mission 60 of a hybrid airship 10 is illustrated according to one embodiment of the present invention. The hybrid airship 10 (also shown in FIGS. 1a and 1b) may be housed in a conventional airship hangar 61. The airship hangar may be located at a base 69. The base 69 may be a main base within the continental United States or an allied base. During preparations for launch, the gas envelopes 21 (FIG. 2) or 31 (FIG. 3) of the hybrid airship 10 may be filled with helium 22 to the capacity needed such that the buoyancy lift of the airship 10 exceeds the total weight of the airship 10. Further, the high energy density power storage system 51 (shown in FIG. 5) may be fully charged. At launch the hybrid airship 10 ascends vertically using buoyancy lift 62 alone after it is released from its moorings. The gas envelopes 21 or 31 containing helium tend to expand as the airship 10 ascends and the ambient atmospheric pressure decreases. The excess helium 22 may be pumped into reservoir gas envelopes 24. The hybrid airship 10 may stop ascending at the equilibrium altitude 63 once the buoyancy lift 62 has decreased to exactly equal the total weight of the airship 10. The equilibrium altitude 63 may be between about 15,000 ft and about 30,000 ft. In order to continue ascending beyond the equilibrium altitude 63, the hybrid airship may transition to forward flight (64). The speed of the hybrid airship 10 may be gradually increased using the propellers 15 driven by the electric motors 14 (shown in FIGS. 1a and 1b). During the transition to forward flight (64), the aerodynamic lift replaces the buoyancy lift lost as the airship 10 climbs. The rate at which the airship 10 accelerates and climbs to its operational altitude 65 may be optimized to reduce air loads on the hybrid airship 10. At higher altitudes, the aerodynamic lift begins to exceed the buoyancy lift supplied by the helium filled gas envelopes 19. When the hybrid airship 10 has reached the operational altitude 65, buoyancy lift may supply only about 2–5% of the total force needed to keep the aircraft 10 aloft. The operation altitude 65 may be, for example, about 85,000 ft for a payload of about 2,500 lb. Once at the operating altitude 65, the hybrid airship 10 cruises to the assigned theater of operations 66. The cruising speed of the hybrid airship 10 may be around 100 kt. The hybrid airship 10 may spend its entire operational life at this benign flight condition. At an operational altitude 65 of 85,000 ft, for example, ambient winds rarely exceed 40 kt, and the dynamic pressure is less than 2 pounds per square foot. Deploying from a base 69 (e.g., an allied base or a permanent base in the continental United States), the hybrid airship 10 may reach any spot in the world within four days. Once the assigned theater of operations 66 is reached, the hybrid airship 10 may operate as an military intelligence, surveillance, and reconnaissance platform as well as a communications relay platform for a naval task force or other US military forces in the area. The payload capacity of the airship 10 may accommodate high power directed energy devices using large area electromagnetic antennas 56 as well as a wide range of electro-optical, radar, and laser designation devices. The payload antennas and devices 56 may be mounted to the lower skin 112 of the outer shell 11 of the hybrid airship 10 (FIGS. 1a and 1b). The avionics suite 55 of the airship 10 may be capable of both satellite (67) and line-of-sight (68) communications. The hybrid airship 10 may be capable of continuous operation at the operational altitude 65 for month or even years. The hybrid airship 10 may have a structural life that may be considerably higher compared to the structural life of a fixed wing aircraft since the airship 10 is an inflatable structure operating under very low flight loads. Furthermore, the hybrid airship 10 (as shown in FIGS. 1a and 1b) may not be subjected to a high number of takeoff and landing cycles or pressurization/depressurization cycles, since the airship 10 may operate continuously at high altitude cruise condition using the regenerative all-electric propulsion system 50 (as shown in FIG. 5). The major limiting factor that may determine the lifetime of the hybrid airship 10 may therefore be the operational life and reliability of the propulsion system 50 and other airship subsystems.

Since the operational lifetime of the hybrid airship 10 (as shown in FIGS. 1a and 1b) may be limited mainly by the operational lifetime and reliability of the subsystems of the airship 10 rather than the airframe lifetime, it may be more cost effective to design the hybrid airship 10 as a single mission expendable vehicle. The design of the hybrid airship 10, as shown in FIGS. 1a and 1b, could be simplified, for example, by not requiring a large supply of helium 22 to replace leakage losses. As helium 22 leaks from the gas envelopes 21 (FIG. 2) or 31 (FIG. 3), a simple electrically driven impeller 54 (FIG. 5) may be able to keep the gas envelopes 21 or 31 inflated to the proper pressure to maintain the shape and rigidity of the outer shell 11 (FIGS. 1a and 1b). This will result in a gradual loss of buoyancy, but at the operational altitude 65 (FIG. 6) the buoyancy force only supplies less than about 5% of the total lift. The aerodynamic lift may be increased to accommodate this loss by a slight increase in the wing lift coefficient. Once all of the helium 22 has leaked out of the gas envelopes 21 (FIG. 2) or 31 (FIG. 3) and has been replaced with pressurized air, the hybrid airship 10 essentially may become a large inflatable aircraft. Making the hybrid airship 10 expendable may also reduce the amount of infrastructure at the main base 69 (FIG. 6). The purpose of the main base 69 in this case may be only to launch new hybrid airships 10, but not to recover or maintain hybrid airships 10 in service. Still, if a hybrid airship 10 would experience an equipment malfunction relatively early in the mission of the airship 10, the hybrid airship 10 may be able to return to the main base 69 for repairs and redeployment.

Figure 7:
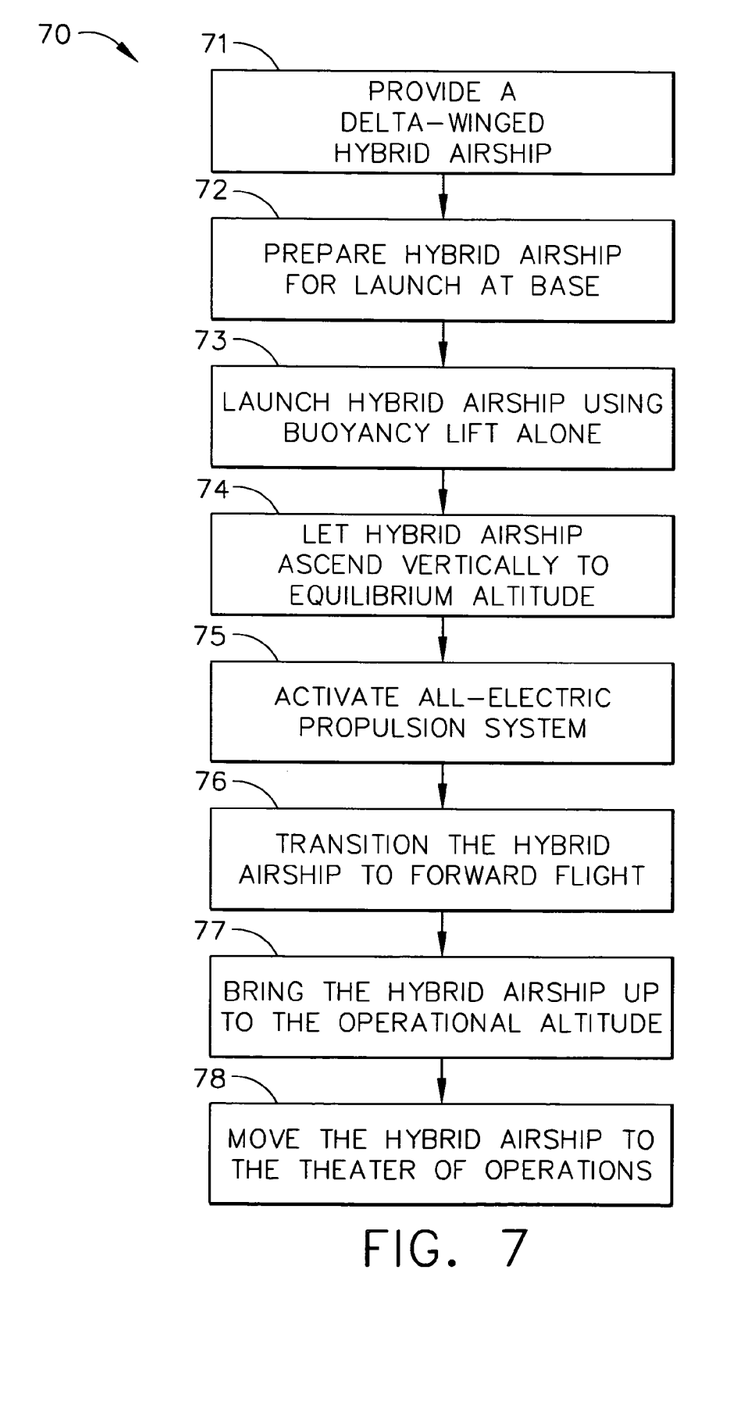
FIG. 7 is a flow chart of a method for using a hybrid airship as a unmanned reconnaissance aerial vehicle according to one embodiment of the present invention.

Referring now to FIG. 7, a flow chart of a method 70 for using the delta-winged hybrid airship 10 as an unmanned airborne communications relay platform is illustrated according to another embodiment of the present invention. The method 70 (also shown by the arrows in FIG. 6) for using the delta-winged hybrid airship 10 (as shown in FIGS. 1a and 1b and as described above) as an unmanned airborne communications relay platform may include the steps of: providing an delta-winged hybrid airship 10 that may include an all-electric regenerative propulsion system 50 (step 71), preparing the hybrid airship 10 for launch at base 69 (step 72); launching the hybrid airship 10 using buoyancy lift 62 alone (step 73); letting the hybrid airship 10 ascend vertically to an equilibrium altitude 63 (step 74); activating the propulsion system 50 (step 75); transitioning the hybrid airship 10 to forward flight (step 76); bringing the hybrid airship 10 up to the operational altitude 65 using aerodynamic lift and buoyancy lift (step 77); and moving the airship 10 to the theater of operations 66 (step 78). The method 70 may further include the steps of: establishing satellite communication 67 between the hybrid airship 10 and a strategic satellite 671; establishing line-of-sight communications 68 between the hybrid airship 10 and a ground station 681; cruising with the hybrid airship 10 over the theater of operations for an extended period of time; operating the hybrid airship 10 as an military or civil communications relay platform for an extended period of time; and returning the hybrid airship 10 to the base 69. Although the delta-winged hybrid airship 10 has been described as being used as an unmanned airborne communications relay platform, other applications may be possible.

It should be understood, of course, that the foregoing relates to exemplary embodiments of the invention and that modifications may be made without departing from the spirit and scope of the invention as set forth in the following claims.

We claim:

1. A delta-winged hybrid airship, comprising:
   a single outer shell having a delta-wing shape and an airfoil cross-section, wherein the longest wingspan of the outer shell is greater than the longest chord length of the outer shell,
   a plurality of gas envelopes within said outer shell, wherein said gas envelopes store helium and provide buoyancy lift to said hybrid airship; and
   an all-electric propulsion system connected with said outer shell, wherein said all-electric propulsion system is operable to provide forward flight of said outer shell that generates the aerodynamic lift of said hybrid airship.

2. The delta-winged hybrid airship of claim 1, wherein said outer shell is made out of a semi-rigid material, is inflatable to a delta-wing shape, and defines an internal volume when inflated.

3. The delta-winged hybrid airship of claim 1, wherein said outer shell defines an internal volume and is made out of a rigid material, said rigid material maintaining said internal volume.

4. The delta-winged hybrid airship of claim 1, wherein said outer shell includes an upper skin, a lower skin, a rounded leading edge, and a sharp trailing edge.

5. The delta-winged hybrid airship of claim 4, further comprising a first vertical tail and a second vertical tail, wherein said first vertical tail is located at a first intersection of said leading edge and said trailing edge, and wherein said second vertical tail is located at a second intersection of said leading edge with said trailing edge.

6. The delta-winged hybrid airship of claim 4, wherein said all-electric propulsion system includes a plurality of propulsion pods located along said trailing edge, a high energy density power storage system located within said internal volume, a photovoltaic array located on said upper skin, and a power conditioning unit located within said internal volume.

7. The delta-winged hybrid airship of claim 6, wherein each of said propulsion pods includes an electric motor and a propeller.

8. The delta-winged hybrid airship of claim 7, wherein said propeller comprises a low Reynolds number propeller suitable to operate at cruise altitudes of about 85,000 ft.

9. The delta-winged hybrid airship of claim 1, wherein said gas envelopes comprise conformal gas envelopes.

10. The delta-winged hybrid airship of claim 1, wherein said gas envelopes comprise cylindrical gas envelopes.

11. A hybrid airship, comprising:
    a single outer shell having a delta-wing shape and an airfoil cross-section, wherein the longest wingspan of said outer shell is greater than the longest chord of the of said outer shell by a factor of at least 2.5;
    a plurality of gas envelopes within said outer shell, wherein said gas envelopes store helium and provide buoyancy lift to said hybrid airship; and
    an all-electric regenerative propulsion system connected with said outer shell, wherein said all-electric regenerative propulsion system is operable to provide forward flight of said outer shell that generates the aerodynamic lift of said hybrid airship; and
    an electrically driven impeller, wherein said impeller provides pressurized air to keep said gas envelopes inflated after said helium is lost through leakage.

12. The hybrid airship of claim 11, wherein said outer shell is semi-rigid and inflatable to a delta-wing shape, wherein said helium filled gas envelopes provide and maintain said shape and rigidity of said outer shell.

13. The hybrid airship of claim 12, wherein said pressurized air is used to replace said helium lost through leakage and to maintain said shape and rigidity of said outer shell.

14. The hybrid airship of claim 11, wherein said outer shell has a wing area of at least 78,000 square feet.

15. The hybrid airship of claim 11, wherein said all-electric regenerative propulsion system includes a plurality of propellers and wherein said propellers are used to steer said airborne platform through differential thrusting.

16. The hybrid airship of claim 11, further comprising a plurality of reservoir tanks, wherein said helium is replenished from said reservoir tanks to compensate leakage losses in said gas envelopes.

* * * * *